United States Patent [19]
Niki

[11] 3,874,343
[45] Apr. 1, 1975

[54] WATER DISPENSER FOR SMALL ANIMALS

[76] Inventor: Motohiro Niki, 22-11, Yushima 2-chome, Bunkyo-ku, Tokyo-to, Japan

[22] Filed: Mar. 4, 1974

[21] Appl. No.: 447,773

[30] Foreign Application Priority Data
Mar. 3, 1973 Japan.................................. 48-27122

[52] U.S. Cl.................................. 119/72.5, 119/75
[51] Int. Cl.............................................. A01k 7/00
[58] Field of Search ......... 119/72.5, 75; 137/614.18

[56] References Cited
UNITED STATES PATENTS
2,710,594  6/1955  Thompson ......................... 119/72.5
3,289,635  12/1966  Eagles................................ 119/72.5
FOREIGN PATENTS OR APPLICATIONS
957,300  5/1964  United Kingdom................ 119/72.5

Primary Examiner—Louis G. Mancene
Assistant Examiner—J. N. Eskovitz

[57] ABSTRACT

In a water dispenser comprising a casing, water supply means having an outlet, valve means for controlling water delivery, and a water feed tube depending from the valve means, the valve means is made of an elastic valve seat member having an annular surface portion and a central recessed portion, and a poppet valve member is centrally connected with the upper end of the water feed tube and normally engages the annular surface of the valve seat member, the water feed tube downwardly penetrating the recessed portion of the valve seat means in a water-tight manner, apertures being provided through the upper part of the same tube.

2 Claims, 3 Drawing Figures 3,874,343

WATER DISPENSER FOR SMALL ANIMALS

BACKGROUND OF THE INVENTION

This invention relates generally to water dispensers for feeding small animals, and more particularly to an improved type thereof specifically adapted for feeding mice and rats.

Automatic feeding of drinking water to experimental animals is essential for labor-saving breeding of these animals and for providing a supply of drinking water at all times.

Among water dispensers for various small animals and birds, those for the mice and rats are technically most retarded, and none of the devices proposed heretofore have yet been accepted for general use. The reason for this is that a large number of water dispensers are required since mice and rats constitute a majority of the experimental animals. This requirement inevitably necessitates a simplified construction of water dispensers which can be produced at a substantially low cost. Despite this necessity for low-cost construction, however, requirements such as prevention of water leakage and provision of sensitivity in operation are more strict than those for the water dispensers for other animals and birds. These requirements arise from the requirement that the care of these animals be almost completely free of labor such as bed cleaning and drying and the requirement that the drinking water be readily supplied upon application of a weak nudging force of the mice and rats against a part of the water dispenser but can be instantaneously stopped upon removal of the same force with some amount of the water always kept in a part of the dispenser so that the animal can easily find the part to be nudged.

SUMMARY OF THE INVENTION

Therefore, an object of the present invention is to provide a water dispenser for feeding small animals of extremely simple construction and low production cost.

Another object of the present invention is to provide a water dispenser for feeding small animals having valve means which is extremely sensitive in operation, whereby the drinking water can be released by a slight nudging of the water feed tube.

Still another object of the invention is to provide a water dispenser for feeding small animals wherein leakage of the drinking water at the time of closure of the valve is substantially eliminated.

An additional object of the invention is to provide a water dispenser for feeding small animals wherein a required quantity of the water is always kept at the lower part of the dispenser.

These and other objects have been achieved by the present invention, according to which there is provided an improved construction of a water dispenser of a type comprising a casing, water supplying means having an outlet and supported by the casing, valve means for controlling the delivery of water through the outlet, and a water feed tube depending from the valve means, the water dispenser being characterized by the improvement wherein the valve means comprises an elastic valve seat member sealingly secured to the outlet of the water supplying means and having a horizontal upper planar surface with a water-retaining recess provided downwardly at the center and a poppet valve member including a central stem portion extending in said recess and a cap portion having a lower surface normally engaging the planar surface in a fluid-tight manner, and wherein the water feed tube is extended upwardly through the valve seat member into the recess so that the upper end thereof is secured to the stem portion of the valve member, and the water feed tube is provided with aperture means formed through the upper end portion thereof thereby to communicatively connect the interior of the recessed space to the interior of the feed tube, the water feed tube being adapted to be inclined by nudging by the small animals at the lower end thereof, thereby causing the cap portion to be inclined relative to the planar surface so that a clearance is created between the cap and the seat member, thus allowing the water in the water supplying means to flow through the clearance and the recess into the water feed tube.

The nature, principle, and utility of the present invention will be fully understood from the following detailed description of the invention when read in conjunction with the accompanying drawings.

DETAILED DESCRIPTION

Figure 1:
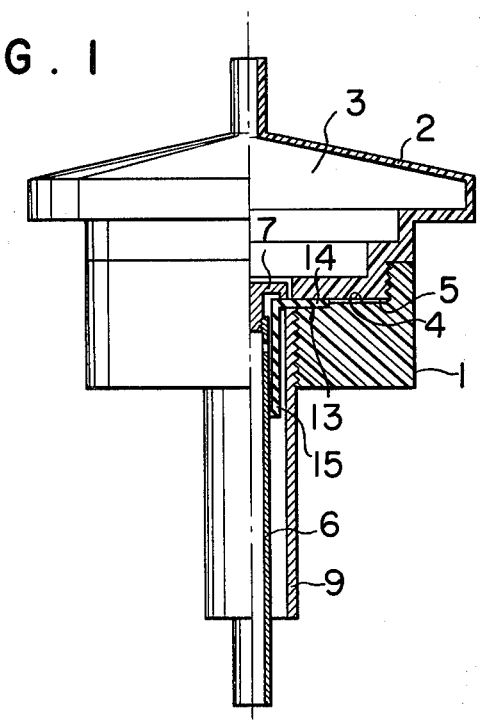
FIG. 1 is an elevational view, partly in vertical section, of an example of a water dispenser according to the present invention.

Referring first to FIG. 1, the water dispenser, according to the present invention, for feeding drinking water to small animals comprises a casing (or a supporting member) 1 and a water supplying reservoir 2 screw fastened to the upper part of the casing 1. The reservoir 2 has an internal chamber 3 for storing drinking water, and the lower surface 5 of the bottom wall of the chamber 3 confronts the bottom surface of a central recess 4 in the casing 1, when the reservoir 2 is thus fastened to the casing 1, with a slight gap maintained therebetween. An outlet port 8 is provided at the center through the bottom wall of the chamber 3.

A poppet valve member 7 having a cap-like portion 7a having a diameter smaller than that of the outlet port 8 and having a T-shaped configuration in vertical section including a downwardly projecting central stem 7b is inserted in the outlet port 8, and the central stem 7b is fixedly connected to the upper end of a water feeding tube 6. The casing 1 is further provided with a screw threaded central hole 10, and a guard tube 9 having a diameter corresponding to that of the hole 10 and having a threaded portion at the upper part thereof is screwed into the central hole 10. The water feed tube 6 is provided with a required number of perforations 12 near the upper end thereof connected to the stem portion 7b of the valve member 7.

An elastic valve seat member 13 formed into a T-shaped configuration in vertical section and having an upper flange seat portion 14 and a downwardly extending cylindrical portion 15 is further provided to cooperate with the valve member 7 as described hereinafter in more detail. The outer peripheral portion of the flange portion 14 is firmly clamped in a water-tight manner between the lower surface 5 of the bottom wall of the chamber 3 and the bottom surface of the central recess 4 and in a manner such that the downwardly extending cylindrical portion 15 is held concentrically with the outlet port 8 of the chamber 3 and with the poppet valve member 7 received therein.

Figure 2:
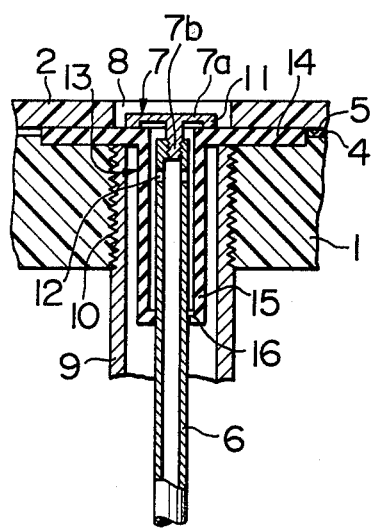
FIG. 2 is an enlarged sectional view of an important part of the water dispenser shown in FIG. 1.

More specifically, the poppet valve member 7 connected to the water feed tube 6 is inserted through the central hollow space of the cylindrical portion 15 of the elastic valve seat member 13 in a concentric manner, as shown in FIG. 2, such that the lower surface 11 of the cap-like portion 7a, which is in this example formed with a peripheral edge slightly projecting downwardly, contacts the upper planar surface of the flange portion 14 of the elastic valve seat member 13.

It should be noted that the central hollow space of the cylindrical portion 15 of the elastic valve seat member 13 is reduced in diameter at the lowermost end thereof so that the water feed tube 6 passing through the cylindrical portion 15 of the valve seat member 13 engages the end wall 16 in a water-tight manner, and an annular chamber is formed within the cylindrical portion 15 of the elastic valve seat member 13 around the water feed tube 6.

In operation, the water dispenser is secured to an appropriate member in a cage of the mice or rats, and water is supplied into the chamber 3 within the water supplying reservoir 2. In this state, the flowing down of the water is stopped by the poppet valve member 7, with the lower surface 11 of the poppet valve member 7 engaging the upper planar surface of the elastic valve seat member 13.

Figure 3:
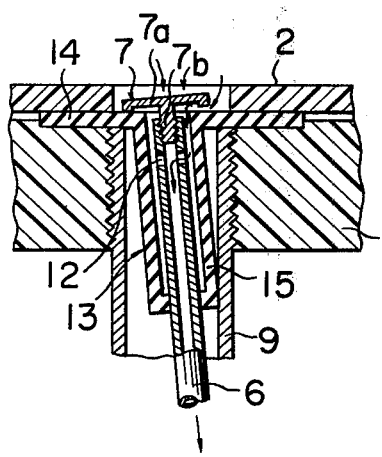
FIG. 3 is a sectional view similar to FIG. 2 showing the water dispenser in an operational state wherein the valve means is partly opened.

When the lower end of the water feed tube 6 is touched by small animals such as mice and rats, the water feed tube 6 is thereby inclined as shown in FIG. 3 against the resilient force of the elastic valve seat member 13. The caplike portion 7a of the poppet valve member 7 at the upper end of the water feed tube 6 is thereby inclined relative to the upper planar surface of the valve seat member 13, thus forming a narrow gap on one side thereof between the lower surface 11 of the cap-like portion 7a and the upper surface of the valve seat member 13. Water in the chamber 3 is thus passed through the narrow gap into the annular space formed within the cylindrical portion 7b of the valve seat member 13. The water is then passed through the apertures 12 to the interior of the water feed tube 6, and thereafter toward the lower end of the water feed tube 6.

Since the lower end wall 16 of the cylindrical portion 15 of the valve seat member 13 engages the circumferential wall of the water feed tube 6 in an water-tight manner, any leakage of water through this part is completely eliminated. Furthermore, the sizes of the poppet valve 7, apertures 12 and the inner diameter of the water feed tube 6 are so selected that the flowrate of the water flowing through the water feed tube 6 at the time when the lower end thereof is touched by a mouse or rat becomes suitable for normal drinking of the water by the mouse or rat. In this manner, the possibility of the water being spilled onto the cage bed can be substantially eliminated.

When the animal ceases to nudge the lower end of the water feed tube 6, the poppet valve instantaneously stops the water flow. In this case, however, the water filling the interior of the water feed tube or at least the space formed in the cylindrical portion 14 of the valve seat member 13 is retained even after the closure of the valve means. A mouse or rat that desires to drink water senses the water vapor coming from the lower end of the water feed tube 6 and nudge the end as described above.

The guard tube 9 protects the water feed tube 6 from any mechanical damage, and limits lateral movements of the water feed tube 6. When it is desired to readjust the contact pressure between the cap-like portion 7a of the valve member 7 and the valve seat member 13, the water feed tube 6 can be slightly pushed into or pulled out of the cylindrical portion 15 of the valve seat member 13.

What we claim is:

1. In a water dispenser for feeding small animals, comprising a casing supplied with water and having a water outlet at its bottom; an elastic valve seat sealingly secured in said water outlet and having a horizontal upper planar surface; a poppet valve member having a lower surface normally engaging said planar surface in a water-tight manner; a vertical feed tube secured to said poppet valve at its upper end and extending downwardly through said valve seat member away from said casing, whereby when said feed tube is inclined said poppet valve is also inclined relative to said valve seat to allow the water in the casing to flow down through a gap formed between said valve seat and said poppet valve; means forming an annular water receiving space for temporarily receiving therein the water which has flowed down through said gap; and aperture means formed through said feed tube to conduct the water in said water receiving space into the interior of said feed tube to cause the water to flow down therein, said valve seat comprising a horizontal annular flange providing said planar surface and an open-top cylindrical portion terminating at a bottom, said feed tube extending vertically through the interior of said cylindrical portion with an annular space interposed between said cylindrical portion and said feed tube, said annular space forming said water receiving space, said aperture means being formed in the part of the feed tube located in said cylindrical portion and at a level higher than the bottom of said cylindrical portion.

2. The water dispenser as set forth in claim 1, further comprising a guard tube coaxially extending around said water feed tube and fixedly connected to said casing, whereby lateral inclining movement of said water feed tube is limited.

* * * * *